Figure 1:
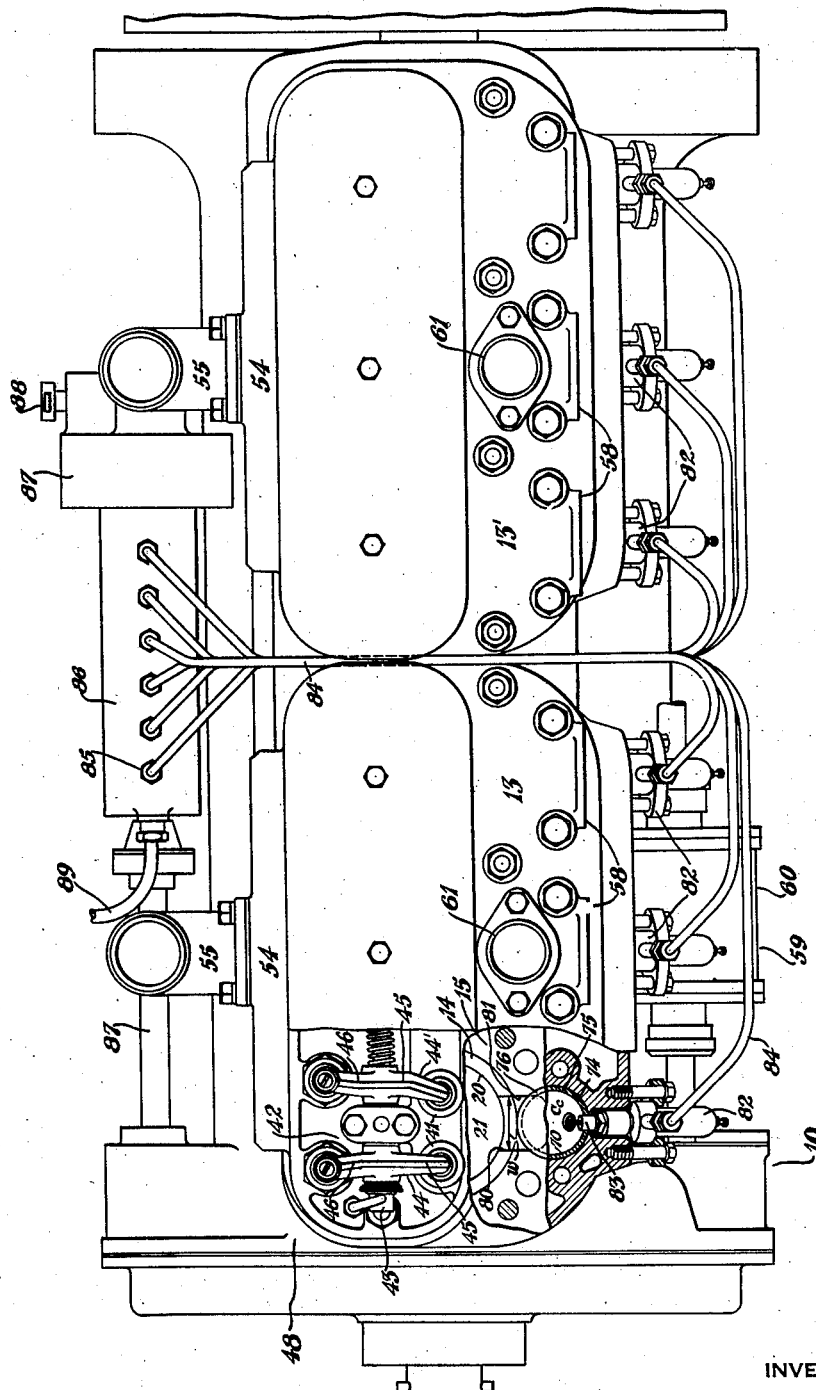

May 22, 1934.  O. D. TREIBER  1,960,093
COMPRESSION IGNITION INTERNAL COMBUSTION ENGINE
Filed Feb. 3, 1933  4 Sheets-Sheet 1

INVENTOR
O. D. Treiber
BY Frease and Bishop
ATTORNEYS

May 22, 1934.    O. D. TREIBER    1,960,093
COMPRESSION IGNITION INTERNAL COMBUSTION ENGINE
Filed Feb. 3, 1933    4 Sheets-Sheet 3

INVENTOR
O. D. Treiber
BY
ATTORNEYS

May 22, 1934.    O. D. TREIBER    1,960,093
COMPRESSION IGNITION INTERNAL COMBUSTION ENGINE
Filed Feb. 3, 1933    4 Sheets-Sheet 4

Inventor
O. D. Treiber
By Frease and Bishop
Attorneys

Patented May 22, 1934

1,960,093

UNITED STATES PATENT OFFICE 1,960,093

COMPRESSION IGNITION INTERNAL COMBUSTION ENGINE

Otis D. Treiber, Canton, Ohio, assignor to Hercules Motors Corporation, Canton, Ohio, a corporation of Ohio Application February 3, 1933, Serial No. 655,079

32 Claims. (Cl. 123—32)

REISSUED

My invention relates in general to internal combustion engines of the compression ignition type and in which preferably liquid hydrocarbon fuel is injected into the combustion chambers of the engine.

In the operation of such an engine, which may be termed a compression ignition injection engine, it is desired to burn the liquid fuel at a time in relation to the position of the piston of each cylinder and at a rate or velocity of burning so as to create a rise in pressure in the burning fuel charge contained in the combustion chamber or chambers formed in part by each piston, so that as each piston passes over top dead center from the compression stroke into the power stroke, the velocity or rate of increase of the rising pressure in the burning fuel charge is such as to produce a desired maximum pressure and such as to maintain this maximum pressure substantially constant during the power stroke of the piston until combustion of the fuel charge is complete.

In the creation of this desired pressure rise in the burning charge it is necessary that the preferably atomized particles of the liquid hydrocarbon fuel be intimately contacted and mixed with the molecules of oxygen of the air introduced into the combustion chamber or chambers so that the uniting or combustion of the particles of fuel and the molecules of oxygen is effected at such rate so as to develop and maintain the desired pressure rise in the burning fuel charges as aforesaid.

In any particular compression ignition injection engine, the attainment of the desired character of fuel combustion as aforesaid, for any given speed of rotation of the crank shaft of the engine is evidenced by a relatively high mean indicated pressure in the combustion chambers of the engine.

On the other hand it is very desirable, particularly in the case of industrial and automotive engines, that the speed of rotation of the crank shaft be as high as possible, so as to obtain maximum power with minimum weight of engine.

As the number of crank shaft revolutions per unit of time increases, the time interval in which it is possible to mix, and unite or burn each fuel and air charge as aforesaid, becomes less in direct inverse ratio to the increase in the number of crank shaft revolutions per unit of time.

Consequently the usual dynamic and pressure conditions found suitable in the mixing and combustion chambers of relatively low speed compression ignition injection engines for a proper rate of mixing and uniting or burning of the hydrocarbon particles and the oxygen molecules is not adequate to effect proper mixing and uniting or burning as the crank shaft revolutions increase per unit of time.

The foregoing difficulties incident to the construction and operation of compression ignition injection engines is furthermore evidenced by the fact that prior to the present improvements, the maximum generally known speed of rotation of the crank shaft of such an engine was only 1800 R. P. M. with a mean indicated pressure, or in other words, an indicated mean effective pressure of 100 to 110 pounds per square inch in the combustion chambers.

The objects of the present improvements include in general the provision of a compression ignition internal combustion engine in which the preferably liquid hydrocarbon fuel is injected into the combustion chambers of the engine, and which is capable of operation at relatively high speeds of rotation of the crank shaft of the engine, which may be for example 2000 to 3000 R. P. M., and with a relatively high mean indicated pressure in the combustion chambers of the engine, which may be for example a mean indicated pressure of as high as 160 pounds per square inch at 2000 R. P. M.

The objects of the present improvements include in particular the provision of a compression ignition internal combustion engine in which the mixing and combustion chambers are so formed and arranged as to cause proper mixing and combustion of the injected fuel at high speeds of rotation of the crank shaft of the engine.

The foregoing and other objects are attained by the improvements, apparatus, parts, combinations, and sub-combinations which comprise the present invention, and the nature of which is set forth in the following general statement and preferred embodiments of which, together with their mode of use, are set forth in the following description, and which are particularly and distinctly pointed out and set forth in the appended claims forming part hereof.

The nature of the improvements of the present invention may be described in general terms as including in an internal combustion engine, one or more cylinders, each cylinder having a bore extending therethrough, a cylinder head having a preferably flat inner face extending transversely across one end of the cylinder bore, a piston operatively mounted for reciprocation in the cylinder bore, the piston having a preferably flat end face located opposite and parallel with the preferably flat cylinder head inner face, and the cylinder head inner face and the cylinder bore and the piston end face forming therebetween a varying volume chamber, walls having inner faces forming a constant volume chamber closely adjacent the cylinder, and walls forming a passageway communicatingly connected at one end with the constant volume chamber and at the other end with the preferably cylindrical bore, the constant volume chamber having a curved inner surface which is symmetrical about an axis extending at right angles to the plane passing through the center of the constant volume chamber and the axial direction of movement of the piston, and the curved inner surface of the constant volume chamber is preferably spherical, the passageway having an inner face which is laterally continuous with the preferably flat inner cylinder head face of the varying volume chamber, and the laterally continuous passageway face being tangential with the curved inner surface of the constant volume chamber, and means for introducing a combustion supporting medium into the varying volume chamber, the combustion supporting medium being usually atmospheric air containing the usual amount of gaseous oxygen, and means for injecting fuel into the constant volume chamber.

It is desirable to inject the fuel into the preferably spherical constant volume chamber in the form of an atomized conical spray of fuel particles, the longitudinal axis of the spray preferably pasing through the center of the spherical constat volume chamber and extending therefrom towards the passageway and the cylinder.

The apex angle of the conical spray should be substantially no greater than 10 degrees and substantially no less than 6 degrees, and the best results are obtained when the apex angle of the conical spray is 8 degrees.

It is preferred that the longitudinal axis of the conical fuel spray shall be directed preferably through the center of the spherical constant volume chamber as aforesaid, and towards the passageway opening, and that the location of the longitudinal axis of the spray lie between a plane passing through the center of the spherical constant volume chamber and parallel with the flat inner cylinder head face and a plane extending preferably through the center of the spherical constant volume chamber and towards the preferably flat inner cylinder head face, and at an angle of 45 degrees with the plane of the flat inner cylinder head face, and the best results are obtained when the angle of the longitudinal axis of the conical spray with respect to the flat inner cylinder head face is 16 degrees.

Mechanical clearance only is preferably provided between the flat piston end face and the opposite flat inner cylinder head face at the top dead center position of the piston, and the total volume of the spherical constant volume chamber and the passageway, which constitute the clearance volume of the engine, is made relatively small with respect to the maximum volume of the varying volume chamber, so that the compression ratio of the engine may be high for example 15.8 to 1. It is also preferred that the length of the passageway between the constant volume chamber and the varying volume chamber be as short as possible.

The engine preferably includes further novel improvements as illustrated in the drawings and/or as hereinafter set forth.

Figure 2:
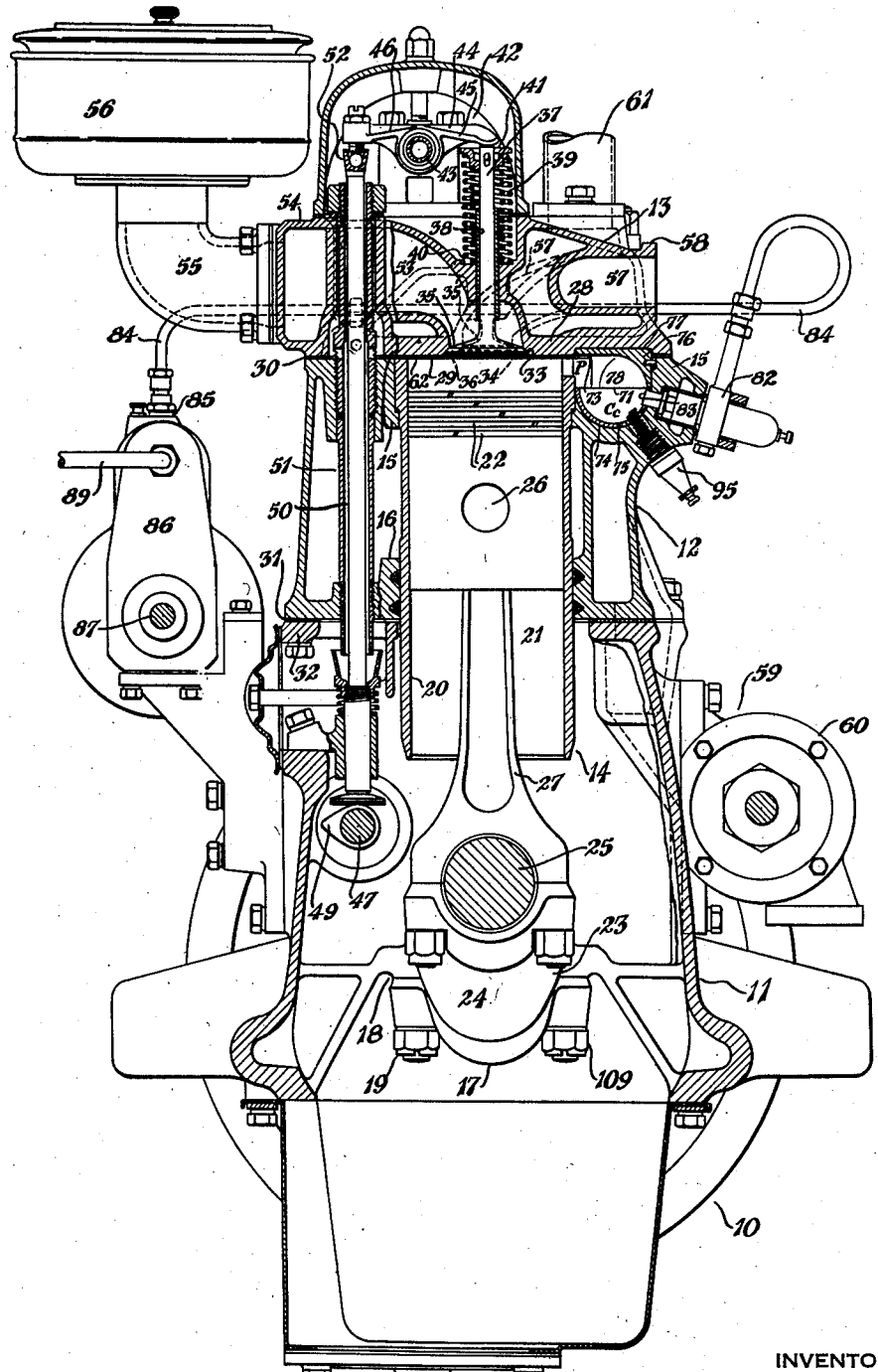
Figure 3:
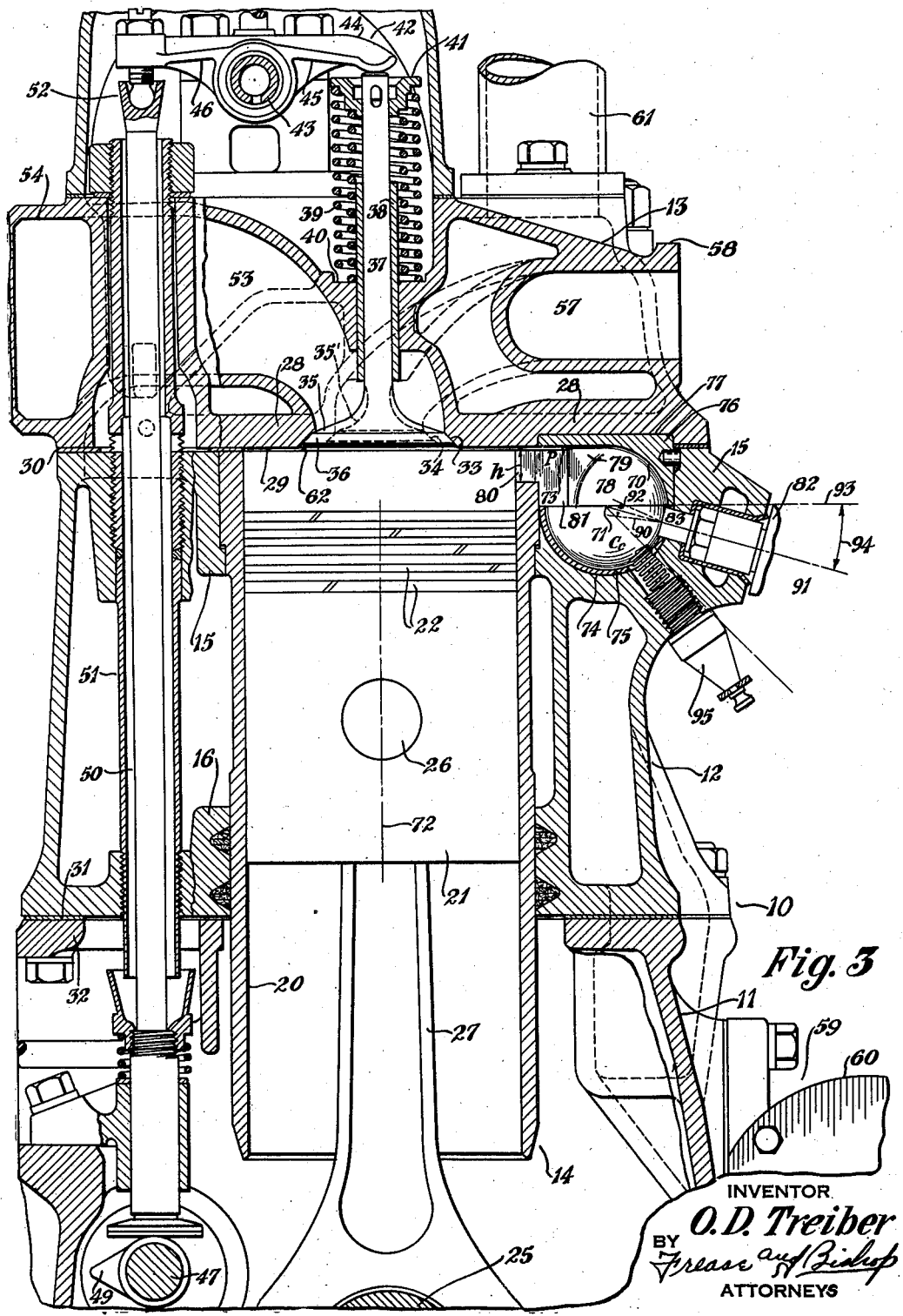
Figure 4:
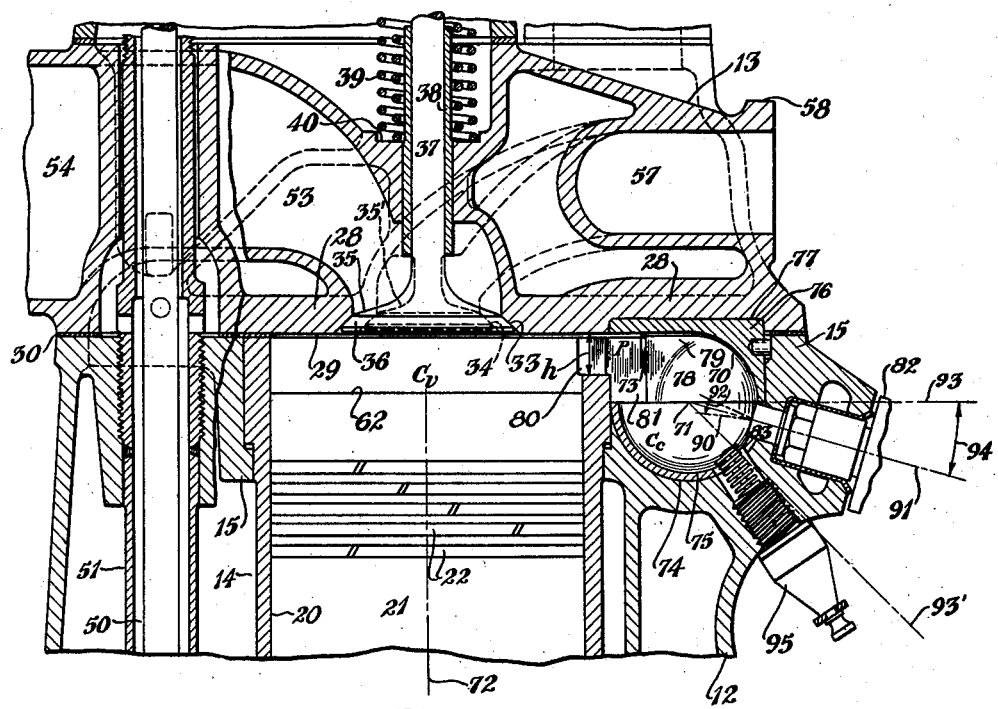
Figures 5, 6:
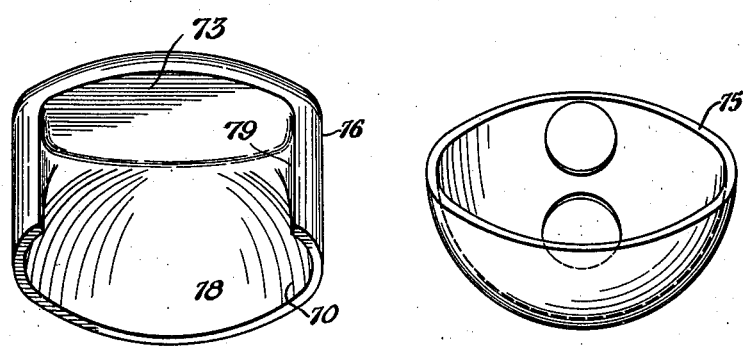

A compression ignition internal combustion engine embodying among others the present improvements is illustrated in the accompanying drawings forming part hereof in which Figure 1 is a fragmentary top plan view of a compression ignition internal combustion engine embodying among others the present improvements with portions broken away to illustrate details of construction and arrangement and in particular to illustrate the construction and arrangement of one of the varying volume chambers formed in the bore of one of the cylinders between its piston and the cylinder head, the adjacent constant volume chamber and the nozzle for injecting fuel therein, and the passageway connecting the constant volume chamber with the varying volume chamber;

Fig. 2, a slightly enlarged transverse sectional view thereof, with portions broken away, and illustrating the cylinder and piston of Fig. 1, with the piston located in the cylinder at its top dead center position just at the end of the compression stroke of the piston, and with others of the engine parts shown in their relative positions when the piston is at top dead center and has cut-off communication between the varying volume chamber of the cylinder and the passageway leading to its constant volume chamber; and further illustrating the preferred construction and arrangement of the passageway with one of its inner surfaces laterally continuous with the preferably flat face of the cylinder head forming the stationary end of the varying volume chamber, and the laterally continuous passageway face being tangential with the preferably spherical constant volume chamber; and further illustrating an air cleaner in place on one of the air intake elbows of the engine;

Fig. 3, a still further enlarged fragmentary view of portions of Fig. 2;

Fig. 4, a fragmentary view similar to Fig. 3, and illustrating the piston and other parts in their relative positions as the piston is traveling towards the cylinder head on its compression stroke, and before the piston commences to traverse the end of the passageway terminating in the cylinder bore;

Fig. 5, a detached perspective view illustrating the details of construction of one of the preferred removable normally upper constant volume chamber forming members; and Fig. 6, a detached perspective view illustrating one of the preferred normally lower hemispherical liner shells for one of the constant volume chambers.

Similar numerals refer to similar parts throughout the several views.

The compression ignition internal combustion engine embodying among others the present improvements is indicated generally at 10, and as illustrated is a six cylinder, four stroke cycle, single action, high speed, compression ignition internal combustion engine, in which the air for combustion is obtained normally directly from the atmosphere, and in which separate quantities or charges of the preferred liquid hydrocarbon fuel, such as Diesel oil, are successively injected into the combustion chambers of the engine at successive timed intervals, one charge being injected into the combustion chambers of each cylinder during each four stroke cycle of the piston operatively mounted in the cylinder.

The compression ignition internal combustion engine 10, includes in combination with other usual parts of a high speed internal combustion engine, a crank case 11, a cylinder block 12, and cylinder heads 13 and 13'.

The cylinder block 12 includes therein walls forming the cylinders, one of which is illustrated in detail in the drawings and is indicated at 14, and the cylinders 14 as illustrated are preferably in the form of externally shouldered sleeves each of which extends through and is seal seated in registering bores formed respectively in the normally upper cylinder block wall 15 and the normally lower cylinder block wall 16.

The cylinder heads 13 and 13', the cylinder block 12, the crank case 11, and the lower half 17 of each main bearing block 18 are preferably separable, and are preferably unitarily secured together by the eccentric shouldered through bolt means set forth in the prior application of Charles Balough, for Engine structures, filed November 22, 1930, Serial No. 497,589, the lower ends of such through bolts and the nuts therefor being shown at 19 in the drawings.

In the bore 20 of each of the sleeve cylinders 14, a piston 21 provided with piston rings 22 is operatively mounted in a usual manner for high speed engines for reciprocation in the cylinder bore.

A crank shaft 23 is operatively mounted in a usual manner for high speed engines in the crank case in the main bearing blocks 18, and the crank shaft 23 includes, opposite each piston 21, crank arms 24 between the outer ends of which extends a crank pin 25, and each piston 21 has operatively mounted therein in a usual manner for high speed engines a wrist pin 26, and a connecting rod 27 operatively connects each crank pin 25 with each wrist pin 26.

It is to be particularly noted that the crank shaft 23, the connecting rods 27, the wrist pins 26, and the pistons 21 are not only operatively associated with each other as aforesaid in a usual manner for high speed engines, but are each of the size, proportion, and minimum weight, characteristic of such parts for high speed engines.

Each cylinder head 13 and 13', includes a normally lower wall 28, each of which is provided for each cylinder covered thereby with a preferably flat normally lower surface 29 extending transversely across the upper end of the bore of the particular cylinder.

A usual gasket 30 is interposed in the usual manner between the normally lower wall 28 of each of the cylinder heads 13 and 13', and the normally upper wall 15 of the cylinder block 12, and similarly a usual gasket 31 is interposed in the usual manner between the normally lower wall 16 of the cylinder block 12, and the normally upper wall 32 of the crank case 11.

As illustrated the engine 10 is a valve-in-head engine, and accordingly each normally lower wall 28 of the cylinder heads 13 and 13' has formed therein above the normally upper end of the bore of each cylinder covered thereby, an air intake valve seat orifice 33 and an exhaust valve seat orifice 34, and each of the valve seat orifices has a valve seat formed therein.

A valve 35 is operatively associated with each valve seat orifice 33, and a valve 35' is operatively associated with each valve seat orifice 34, and each of the valves includes a valve head 36 fitting in its respective seat, and a valve stem 37 extending upwardly from the head.

The cylinder heads 13 and 13' have mounted therein a valve stem guide tube 38 for each valve stem 37, and each valve head 36 is normally maintained in its seat by usual means such as a set of compression springs 39, one end of which reacts against a spring seat 40 formed about each valve stem guide tube 38 in the cylinder head 13, and the other end of which reacts against a flanged washer 41 secured in a usual manner at the upper end of the particular valve stem 37.

A rocker arm cluster indicated generally at 42 is operatively mounted above each cylinder on a rocker arm shaft 43 one of which is mounted on the top of each cylinder head 13 and 13', each rocker arm cluster including a rocker member 44 for the air intake valve for the particular cylinder, and a rocker member 44' for the exhaust valve for the particular cylinder, and each of the rocker members includes a valve stem actuating arm 45 extending from one side of the rocker arm shaft 43 above and in sliding abutment with the upper end of its particular valve stem, and likewise each rocker member includes a push rod actuated arm 46 extending from the opposite side of the rocker arm shaft 43.

A cam shaft 47 is operatively mounted in a usual manner in the crank case 11 at one side of the crank shaft 23, and the cam shaft is driven in a usual manner by the crank shaft as by means of gearing located within the gear housing 48 provided at one end of the crank case.

A cam 49 is provided on the cam shaft 47 for each valve, and a push rod indicated generally by 50 is operatively mounted between each cam 49 and one of the push rod actuated arms 46, each push rod being slidably mounted in push rod guide bearing means indicated generally by 51 and located in the crank case 11, and each push rod extends through sealing and lubricant return tube means indicated generally by 51' and located in the crank case 11, in the cylinder block 12, and in one of the cylinder heads 13 or 13', and the lower end of each push rod 50 abuts against the cam surface of its cam 49, and the upper end of each push rod 50 is provided with a ball and socket connection 52 with its push rod actuated arm 46.

Each air intake valve seat orifice 33 communicatingly connects with one end of an air intake port or passageway 53, the intake ports 53 being formed in the walls of the cylinder heads 13 and 13', and the intake ports of each cylinder head connecting at their outer ends with an intake manifold 54, and each intake manifold 54 communicatingly connecting as by means of an elbow 55 preferably with an air cleaner 56.

Each exhaust valve seat orifice 34 communicatingly connects with one end of an exhaust port or passageway 57, the exhaust ports 57 being formed in the walls of the cylinder heads 13 and 13' and the exhaust ports of each cylinder head terminating at their outer ends in a connector flange 58 whereby the exhaust ports may be communicatingly connected with an exhaust manifold, not shown.

Cooling means indicated generally by 59 are provided for the engine 10, and include a water pump 60 operatively connected in a usual manner with the crank shaft 23 as by means of gearing contained in the gear housing 48, the pump 60 delivering water into communicating water jacket chambers formed in the crank case, in the cylinder block, and in the cylinder heads, and the water jackets of each cylinder head being provided with a cooling water outlet pipe 61 which may be connected in the usual manner with a radiator, not shown, and the radiator being in turn connected in a usual manner with the intake of the pump 60.

In the engine 10, a chamber $C_V$ is formed within the bore 20 of each cylinder 14 and between a normally top or end flat circular face 62 of the piston 21 operating within the particular bore 20 and the opposite flat circular normally lower surface or face 29 of the normally lower cylinder head wall 28 covering the particular bore 20.

Each of the chambers $C_v$ by reason of the reciprocation of the piston forming one wall of the same may be termed a varying volume chamber, and in the engine 10, at top dead center, that is when the end face 62 of each piston 21 has reached its position of maximum travel away from the crank shaft 23, there is only mechanical clearance between the end face 62 of the piston and the opposite flat cylinder head inner face 29.

Walls of the engine form constant volume chambers, one for each cylinder. Each constant volume chamber $C_c$ is located closely adjacent to and entirely at the side of the corresponding varying volume chamber $C_v$; and between each constant volume chamber $C_c$ and its cylinder, walls of the engine form a passageway P communicatingly connecting at one end with the particular constant volume chamber $C_c$ and at the other end with the cylinder bore of the adjacent varying volume chamber $C_v$.

Each constant volume chamber $C_c$ is formed with a curved inner surface 70 which is symmetrical about an axis extending through the center 71 of the constant volume chamber and at right angles or normal to the plane passing through the center 71 of the constant volume chamber and the longitudinal axis 72 of the bore of the adjacent cylinder.

As illustrated, the curved inner face 70 of each constant volume chamber $C_c$ is preferably spherical.

Each passageway P connecting a particular constant volume chamber $C_c$ with the adjacent varying volume chamber $C_v$ is provided with an inner face 73 which is laterally continuous with the preferably flat inner cylinder head face 29 of the adjacent varying volume chamber $C_v$, and each laterally continuous passageway face 73 is tangential with the curved inner surface 70 of the constant volume chamber $C_c$ connected with the adjacent varying volume chamber $C_v$ by the particular passageway P.

The width $w$ of each passageway P is preferably as illustrated somewhat less than the diameter of the preferred spherical inner surface 70 for each constant volume chamber $C_c$, and the minimum height $h$ of each passageway P is preferably somewhat less than the radius of the preferred spherical inner surface 70.

As illustrated each constant volume chamber $C_c$ is formed in a socket 74 provided in the upper end wall 15 of the cylinder block. The bottom surface of each socket 74 is hemispherical and the top surface of each socket 74 is cylindric and tangential with the bottom hemispherical surface.

Preferably a removable liner shell 75 is located in the bottom of each socket 74, each liner shell 75 being preferably externally and internally hemispherical, and the internal hemispherical surface of each liner shell 75 forming a portion of the spherical inner surface 70 of the constant volume chamber $C_c$ formed in part by the particular liner shell 75.

In the upper cylindric end of each socket 74, a preferably removable member 76 is located, and as illustrated each member 76 is externally cylindric and its upper end extends beyond the normally top wall 15 of the cylinder block and into a cylindric recess 77 formed in the adjacent cylinder head lower wall 28.

In the normally lower face of each member 76 is formed a cavity 78 which includes the normally upper portions of the spherical inner surface 70 of the particular constant volume chamber $C_c$ formed in part by the particular member 76, and each cavity 78 also includes end portions 79 of the passageway P communicatingly connecting the particular constant volume chamber $C_c$ with the adjacent varying volume chamber $C_v$.

The remaining portions of each passageway P are formed by an extension of the inner face 29 of the adjacent and connected varying volume chamber $C_v$, and by the side and bottom faces of a notch 80 formed in the upper end of the cylinder sleeve 14 of the particular chamber $C_v$ and by the side and bottom faces of a notch 81 formed in the wall 15 of the cylinder block between the cylinder sleeve notch 80 and the adjacent socket 74.

The air intake valve means heretofore described in general, comprise means operated in a usual manner for introducing preferably atmospheric air including gaseous oxygen, or in other words a combustion supporting medium, into each varying volume chamber $C_v$ on the air intake stroke of the piston thereof; and the exhaust valve means heretofore described in general, provide means for exhausting each varying volume chamber $C_v$ during the exhaust stroke of the piston thereof.

Means are also provided for injecting the preferably liquid hydrocarbon fuel into each constant volume chamber $C_c$ preferably during the compression stroke of the associated piston, and as illustrated the fuel injecting means includes for each constant volume chamber $C_c$ a pintle nozzle 82 each of which is operatively mounted in the cylinder block 12, and the discharge end 83 of each of which extends into and terminates in the constant volume chamber $C_c$ with which the particular nozzle is associated.

Each nozzle 82 is communicatingly connected in a usual manner by a tube 84 with one of the discharge outlets 85 of a usual fuel supply and distributing pump 86 which is driven by a shaft 87 connected in a usual manner with the gearing contained in the gear housing 48. The pump 86 includes timed means injecting a charge of fuel during the proper interval through each of the pipes 84 and the nozzle 82 served thereby into the particular constant volume chamber $C_c$ with which the particular nozzle 82 is associated.

The pump 86 includes governing means which may be contained within casing portions 86' and which are controlled by a control arm 88 which is in effect the throttle for the engine; and the pump 86 is connected by a main fuel supply tube 89 in a usual manner with a source of the desired liquid fuel.

Each nozzle 82 is of usual construction, and is adapted to introduce into the constant volume chamber $C_c$ with which it is associated an atomized conical spray 90 of fuel particles which has its origin located between the plane of the inner face of the cylinder head and a plane of displacement of the piston from the inner face of the cylinder head, that is, at the crank shaft side of the passageway; and the spray is preferably directed towards the passageway P connecting with the particular chamber $C_c$, and in any event, toward the plane of the inner face of the cylinder head.

The longitudinal axis 91 of each conical spray 90 preferably passes through the center 71 of the preferably spherical constant volume chamber $C_c$ served thereby, and according to the present improvements, the apex angle 92 of each conical spray should be substantially no greater than 10 degrees and substantially no less than 6 degrees; and the best results are attained when the apex angle 92 of each conical spray 90 is 8 degrees.

Also according to the present improvements, the longitudinal axis 91 of each conical fuel spray 90 is directed as aforesaid preferably through the center 71 of the constant volume chamber $C_c$ served thereby, and towards the passageway P connecting the particular constant volume chamber $C_c$ with the adjacent varying volume chamber $C_v$; and the axis 91 is located between planes 93 and 93′ passing through the center 71 of the spherical constant volume chamber $C_c$ served by the particular spray, the plane 93 being parallel with the inner preferably flat cylindric head face 29 of the adjacent varying volume chamber $C_v$, and the plane 93′ extending through the center of the particular spherical constant volume chamber $C_c$ and towards the associated flat inner cylinder head face 29 and at an angle of 45 degrees with the plane 93 and thus with the plane of the particular flat inner cylinder head face 29; and the best results are attained when the angle 94 of the longitudinal axis 91 of each conical spray with respect to the plane 93 and thus with respect to the plane of the associated flat inner cylinder head face 29 is 16 degrees.

Each plane 93 may be described in other words as extending through the center 71 of its constant volume chamber $C_c$ and at right angles with respect to the axial direction or line of movement 72 of the associated piston.

As aforesaid mechanical clearance only is preferably provided between each flat piston end face 62 and the opposite flat inner cylinder head face 29 at the top dead center position of the piston, and the total volume of each constant volume chamber $C_c$ and the associated passageway P, which constitute the clearance volume of the particular cylinder, is small relative to the maximum volume of the associated varying volume chamber $C_v$, so that the compression ratio of the engine may be high, for example 15.8 to 1.

It is also preferred as aforesaid that the length of each passageway P be as short as possible, and as illustrated the length of each passageway P is as short as the particular construction and arrangement of the engine 10 will permit.

In the illustrated engine 10, for starting purposes, a usual glow tube 95 is provided in a usual manner for each constant volume chamber $C_c$.

In the operation of the engine 10 including the present improvements, the suction stroke of each piston draws intake air into the varying volume chamber $C_v$ thereof, and the succeeding compression stroke of the piston compresses the charge of air and forces it with very rapidly increasing pressure and velocity from the varying volume chamber $C_v$ through the associated passageway P and into the associated constant volume chamber $C_c$. As the piston moves across and substantially traverses the passageway P on its compression stroke, the opening of the passageway P into the varying volume chamber $C_v$ is rapidly reduced in area, which still further increases the pressure and velocity of the air being forced through the passageway P into the associated constant volume chamber $C_c$.

The fact that as aforesaid the passageway face 73 is an extension of the inner flat face 29 of the varying volume chamber $C_v$, and is tangential to the symmetrical and preferably spherical inner surface 70 of the constant volume chamber $C_c$, causes an unusually effective whirling of the air forced into the chamber $C_c$, the velocity of the whirl increasing as the piston moves across the passageway P and approaches top dead center.

The fuel is sprayed in the manner above set forth across the whirling or revolving air in the combustion chamber $C_c$, and the resulting combustion is of the desired character above set forth, whereby the engine operates at the relatively high speeds and with the relatively high mean indicated pressure above set forth.

I claim:

1. In an internal combustion engine, a cylinder having a cylinder bore extending therethrough, a cylinder head having an inner face extending across one end of the cylinder bore, a piston operating in the cylinder bore, walls forming a spherical chamber closely adjacent to and entirely at the side of the cylinder bore, and walls forming a passageway extending and communicating between the cylinder bore and the spherical chamber, the passageway having one face laterally continuous with the inner face of the cylinder head and tangential to the curved face of the spherical chamber.

2. In an internal combustion engine, a cylinder having a cylinder bore extending therethrough, a cylinder head having a flat inner face extending across one end of the cylinder bore, a piston operating in the cylinder bore, walls forming a spherical chamber closely adjacent to and entirely at the side of the cylinder bore, and walls forming a passageway extending and communicating between the cylinder bore and the spherical chamber, the passageway having one face laterally continuous with the flat inner face of the cylinder head and tangential to the curved face of the spherical chamber.

3. In an internal combustion engine, a cylinder having a cylinder bore extending therethrough, a cylinder head having an inner face extending across one end of the cylinder bore, a piston operating in the cylinder bore, walls forming a constant volume chamber adjacent the cylinder bore, walls forming a passageway extending and communicating between the cylinder bore and the constant volume chamber, the constant volume chamber having a curved inner surface symmetrical about an axis normal to the plane passing through the center of the constant volume chamber and the longitudinal axis of the cylinder bore and the passageway having one face laterally continuous with the inner face of the cylinder head and tangential to the symmetrical curved inner surface of the constant volume chamber, and means for injecting fuel into the constant volume chamber, the fuel injecting means including a nozzle adapted for injecting a conical spray of fuel particles into the constant volume chamber, and the apex angle of the conical spray being substantially within an upper limit of 10 degrees and a lower limit of 6 degrees.

4. In an internal combustion engine, a cylinder having a cylinder bore extending therethrough a cylinder head having an inner face extending across one end of the cylinder bore, a piston operating in the cylinder bore, walls forming a constant volume chamber adjacent the cylinder bore, walls forming a passageway extending and communicating between the cylinder bore and the constant volume chamber, the constant volume chamber having a curved inner surface symmetrical about an axis normal to the plane passing through the center of the constant volume chamber and the longitudinal axis of the cylinder bore and the passageway having one face laterally continuous with the inner face of the cylinder head and tangential to the symmetrical curved inner surface of the constant volume chamber, and means for injecting fuel into the constant volume chamber, the fuel injecting means including a nozzle adapted for injecting a conical spray of fuel particles into the constant volume chamber, and the apex angle of the conical spray being substantially 8 degrees.

5. In an internal combustion engine, a cylinder having a cylinder bore extending therethrough, a cylinder head having an inner face extending across one end of the cylinder bore, a piston operating in the cylinder bore, walls forming a constant volume chamber adjacent the cylinder bore, walls forming a passageway extending and communicating between the cylinder bore and the constant volume chamber, the constant volume chamber having a curved inner surface symmetrical about an axis normal to the plane passing through the center of the constant volume chamber and the longitudinal axis of the cylinder bore and the passageway having one face laterally continuous with the inner face of the cylinder head and tangential to the symmetrical curved inner surface of the constant volume chamber, and means for injecting fuel into the constant volume chamber, the fuel injecting means including a nozzle adapted for injection a conical spray of fuel particles into the constant volume chamber, the longitudinal axis of the conical spray extending through the center of the constant volume chamber and towards the cylinder head at an angle of substantially 16 degrees with a plane extending at right angles to the longitudinal axis of the cylinder bore.

6. In an internal combustion engine, a cylinder having a cylinder bore extending therethrough, a cylinder head having an inner face extending across one end of the cylinder bore, a piston operating in the cylinder bore, walls forming a constant volume chamber adjacent the cylinder bore, walls forming a passageway extending and communicating between the cylinder bore and the constant volume chamber, the constant volume chamber having a curved inner surface symmetrical about an axis normal to the plane passing through the center of the constant volume chamber and the longitudinal axis of the cylinder bore and the passageway having one face laterally continuous with the inner face of the cylinder head and tangential to the symmetrical curved inner surface of the constant volume chamber, and means for injecting fuel into the constant volume chamber, the fuel injecting means including a nozzle adapted for injecting a conical spray of fuel particles into the constant volume chamber, the longitudinal axis of the conical spray extending through the center of the constant volume chamber and towards the cylinder head at an angle of substantially 16 degrees with a plane extending at right angles to the longitudinal axis of the cylinder bore, and the apex angle of the conical spray being substantially 8 degrees.

7. In an internal combustion engine, a cylinder having a cylinder bore extending therethrough, a cylinder head having an inner face extending across one end of the cylinder bore, a piston operating in the cylinder bore, walls forming a spherical chamber adjacent the cylinder bore, and walls forming a passageway extending and communicating between the cylinder bore and the spherical chamber, the passageway having one face laterally continuous with the inner face of the cylinder head and tangential to the curved face of the spherical chamber, and means for injecting fuel into the spherical chamber, the fuel injecting means including a nozzle adapted for injecting a conical spray of fuel particles into the spherical chamber, and the apex angle of the conical spray being substantially within an upper limit of 10 degrees and a lower limit of 6 degrees.

8. In an internal combustion engine, a cylinder having a cylinder bore extending therethrough, a cylinder head having an inner face extending across one end of the cylinder bore, a piston operating in the cylinder bore, walls forming a spherical chamber adjacent the cylinder bore, and walls forming a passageway extending and communicating between the cylinder bore and the spherical chamber, the passageway having one face laterally continuous with the inner face of the cylinder head and tangential to the curved face of the spherical chamber, and means for injecting fuel into the spherical chamber, the fuel injecting means including a nozzle adapted for injecting a conical spray of fuel particles into the spherical chamber, and the apex angle of the conical spray being substantially 8 degrees.

9. In an internal combustion engine, a cylinder having a cylinder bore extending therethrough, a cylinder head having an inner face extending across one end of the cylinder bore, a piston operating in the cylinder bore, walls forming a spherical chamber adjacent the cylinder bore, and walls forming a passageway extending and communicating between the cylinder bore and the spherical chamber, the passageway having one face laterally continuous with the inner face of the cylinder head and tangential to the curved face of the spherical chamber, and means for injecting fuel into the spherical chamber, the fuel injecting means including a nozzle adapted for injecting a conical spray of fuel particles into the spherical chamber, the longitudinal axis of the conical spray extending through the center of the spherical chamber and towards the cylinder head at an angle of substantially 16 degrees with a plane extending at right angles to the longitudinal axis of the cylinder bore.

10. In an internal combustion engine, a cylinder having a cylinder bore extending therethrough, a cylinder head having an inner face extending across one end of the cylinder bore, a piston operating in the cylinder bore, walls forming a spherical chamber adjacent the cylinder bore, and walls forming a passageway extending and communicating between the cylinder bore and the spherical chamber, the passageway having one face laterally continuous with the inner face of the cylinder head and tangential to the curved face of the spherical chamber, and means for injecting fuel into the spherical chamber, the fuel injecting means including a nozzle adapted for injecting a conical spray of fuel particles into the spherical chamber, the longitudinal axis of the conical spray extending through the center of the spherical chamber and towards the cylinder head at an angle of substantially 16 degrees with a plane extending at right angles to the longitudinal axis of the cylinder bore, and the apex angle of the conical spray being substantially 8 degrees.

11. In an internal combustion engine, a cylinder block, a cylinder bore in the cylinder block, a cylinder head having a flat end face normal to the longitudinal axis of the cylinder bore, a piston operatively mounted for reciprocation in the cylinder bore, the piston having a flat end face normal to its longitudinal axis, the piston end face operating opposite the cylinder head end face and forming therewith and with the cylinder bore a varying volume chamber, a constant volume spherical chamber in the cylinder block closely adjacent to and entirely at the side of the cylinder bore, and a passageway in the cylinder block extending and communicating between the cylinder bore and the spherical chamber, the passageway having one face laterally continuous with the flat end face of the cylinder head and tangential to the curved face of the spherical chamber.

12. In an internal combustion engine, a cylinder block, a cylinder bore in the cylinder block, a cylinder head having a flat end face normal to the longitudinal axis of the cylinder bore, a piston operatively mounted for reciprocation in the cylinder bore, the piston having a flat end face normal to its longitudinal axis, the piston end face operating opposite the cylinder head end face and forming therewith and with the cylinder bore a varying volume chamber, a constant volume chamber in the cylinder block closely adjacent to and entirely at the side of the cylinder bore, the constant volume chamber having a curved inner surface symmetrical about an axis normal to the plane passing through the center of the constant volume chamber and the longitudinal axis of the cylinder bore, and a passageway in the cylinder block extending and communicating between the cylinder bore and the constant volume chamber, the passageway having one face laterally continuous with the flat end face of the cylinder head and tangential to the curved inner surface of the constant volume chamber.

13. In an internal combustion engine, a cylinder block, a cylinder bore in the cylinder block, a cylinder head having a flat end face normal to the longitudinal axis of the cylinder bore, a piston operatively mounted for reciprocation in the cylinder bore, the piston having a flat end face normal to its longitudinal axis, the piston end face operating opposite the cylinder head end face and forming therewith and with the cylinder bore a varying volume chamber, a constant volume chamber in the cylinder block closely adjacent to and entirely at the side of the cylinder bore, the constant volume chamber having a curved inner face symmetrical about an axis normal to the plane passing through the center of the constant volume chamber and the longitudinal axis of the cylinder bore, and a passageway in the cylinder block extending and communicating between the cylinder bore and the constant volume chamber, the passageway having one face laterally continuous with the flat end face of the cylinder head and tangential to the curved inner surface of the constant volume chamber, and being adapted to be substantially cut off by the side of the piston at the cylinder head end of its stroke.

14. In an internal combustion engine, a cylinder having a bore extending therethrough, a cylinder head having a flat inner face extending across one end of the cylinder bore, a piston operatively mounted for reciprocation in the cylinder bore, the piston having a flat end face located opposite the flat cylinder head inner face, the cylinder head inner face and the cylinder bore and the piston end face forming therebetween a varying volume chamber, walls forming a constant volume chamber and walls forming a passageway opening at one end into the constant volume chamber and opening at the other end through the cylinder into the varying volume chamber, the constant volume chamber having a spherical inner surface and the passageway having a flat face laterally continuous with the flat cylinder head inner face of the varying volume chamber and being tangential to the spherical inner surface of the constant volume chamber.

15. In an internal combustion engine, a cylinder having a bore extending therethrough, a cylinder head having a flat inner face extending across one end of the cylinder bore, a piston operatively mounted for reciprocation in the cylinder bore, the piston having a flat end face located opposite the flat cylinder head inner face, the cylinder head inner face and the cylinder bore and the piston end face forming therebetween a varying volume chamber, walls forming a constant volume chamber and walls forming a passageway opening at one end into the constant volume chamber and opening at the other end through the cylinder into the varying volume chamber, the constant volume chamber having a spherical inner surface and the passageway having a flat face laterally continuous with the flat cylinder head inner face of the varying volume chamber and being tangential to the spherical inner surface of the constant volume chamber, the center of the spherical face being located at the piston side of the cylinder head, and the cylinder opening of the passageway being substantially traversed by the piston during reciprocation thereof.

16. In an internal combustion engine, a cylinder having a bore extending therethrough, a cylinder head having a flat inner face extending across one end of the cylinder bore, a piston operatively mounted for reciprocation in the cylinder bore, the piston having a flat end face located opposite the flat cylinder head inner face, the cylinder head inner face and the cylinder bore and the piston end face forming therebetween a varying volume chamber, walls forming a constant volume chamber and walls forming a passageway opening at one end into the constant volume chamber and opening at the other end through the cylinder into the varying volume chamber, the constant volume chamber having a spherical inner surface and the passageway having a flat face laterally continuous with the flat cylinder head inner face of the varying volume chamber and being tangential to the spherical face of the constant volume chamber, the center of the spherical inner surface being located at the piston side of the cylinder head, and the cylinder opening of the passageway being substantially traversed by the piston during reciprocation thereof, and the stroke of the piston being such that there is only mechanical clearance between the piston flat end face and the cylinder head flat inner face at the cylinder head end of the piston stroke.

17. In an internal combustion engine, a cylinder having a bore extending therethrough, a cylinder head having a flat inner face extending across one end of the cylinder bore, a piston operatively mounted for reciprocation in the cylinder bore, the piston having a flat end face located opposite the cylinder head inner face, the cylinder head inner face and the cylinder bore and the piston end face forming therebetween a varying volume chamber, walls forming a constant volume chamber and walls forming a passageway opening at one end into the constant volume chamber and opening at the other end through the cylinder into the varying volume chamber, the constant volume chamber having a curved inner surface symmetrical about an axis normal to the plane passing through the center of the constant volume chamber and the longitudinal axis of the cylinder bore and the passageway having one face comprising a laterally continuous extension of the cylinder head flat inner face of the varying volume chamber and being tangential with the symmetrical curved inner surface of the constant volume chamber.

18. In an internal combustion engine, a cylinder having a bore extending therethrough, a cylinder head having a flat inner face extending across one end of the cylinder bore, a piston operatively mounted for reciprocation in the cylinder bore, the piston having a flat end face located opposite the cylinder head inner face, the cylinder head inner face and the cylinder bore and the piston end face forming therebetween a varying volume chamber, walls forming a constant volume chamber and walls forming a passageway opening at one end into the constant volume chamber and opening at the other end through the cylinder into the varying volume chamber, the constant volume chamber having a curved inner surface symmetrical about an axis normal to the plane passing through the center of the constant volume chamber and the longitudinal axis of the cylinder bore and the passageway having one face comprising a laterally continuous extension of the cylinder head flat inner face of the varying volume chamber and being tangential with the symmetrical curved inner surface of the constant volume chamber, and means for introducing a combustion supporting medium into the varying volume chamber.

19. In an internal combustion engine, a cylinder having a bore extending therethrough, a cylinder head having a flat inner face extending across one end of the cylinder bore, a piston operatively mounted for reciprocation in the cylinder bore, the piston having a flat end face located opposite the cylinder head inner face, the cylinder head inner face and the cylinder bore and the piston end face forming therebetween a varying volume chamber, walls forming a constant volume chamber and walls forming a passageway opening at one end into the constant volume chamber and opening at the other end through the cylinder into the varying volume chamber, the constant volume chamber having a curved inner surface symmetrical about an axis normal to the plane passing through the center of the constant volume chamber and the longitudinal axis of the cylinder bore and the passageway having one face comprising a laterally continuous extension of the cylinder head flat inner face of the varying volume chamber and being tangential with the symmetrical curved inner surface of the constant volume chamber, and means for injecting fuel into the constant volume chamber.

20. In an internal combustion engine, a cylinder having a bore extending therethrough, a cylinder head having a flat inner face extending across one end of the cylinder bore, a piston operatively mounted for reciprocation in the cylinder bore, the piston having a flat end face located opposite the cylinder head inner face, the cylinder head inner face and the cylinder bore and the piston end face forming therebetween a varying volume chamber, walls forming a constant volume chamber and walls forming a passageway opening at one end into the constant volume chamber and opening at the other end through the cylinder into the varying volume chamber, the constant volume chamber having a curved inner surface symmetrical about an axis normal to the plane passing through the center of the constant volume chamber and the longitudinal axis of the cylinder bore and the passageway having one face comprising a laterally continuous extension of the cylinder head flat inner face of the varying volume chamber and being tangential with the symmetrical curved inner surface of the constant volume chamber, and means for introducing a combustion supporting medium into the varying volume chamber, and means for injecting fuel into the constant volume chamber.

21. In an internal combustion engine, a cylinder having a bore extending therethrough, a cylinder head having an inner face extending across one end of the cylinder bore, and walls forming a chamber at one side of the cylinder and a passageway extending and communicating between the cylinder bore and the chamber, a crank shaft, a piston operatively associated with the crank shaft and reciprocating in the cylinder bore, the piston during its compression stroke moving across and reducing the sectional area of the passageway, and means for injecting a spray of fuel into the chamber, the spray having its origin located at the crank shaft side of the passageway, and the spray being directed towards the passageway.

22. In an internal combustion engine, a cylinder having a bore extending therethrough, a cylinder head having an inner face extending across one end of the cylinder bore, and walls forming a chamber at one side of the cylinder and a passageway extending and communicating between the cylinder bore and the chamber, a crank shaft, a piston operatively associated with the crank shaft and reciprocating in the cylinder bore, and means for injecting a spray of fuel into the chamber, the spray having its origin located at the crank shaft side of the inner face of the cylinder head, and the spray being directed towards the plane of the inner face of the cylinder head.

23. In an internal combustion engine, a cylinder having a bore extending therethrough, a cylinder head having an inner face extending across one end of the cylinder bore, and walls forming a chamber at one side of the cylinder and a passageway extending and communicating between the cylinder bore and the chamber, a piston operative for reciprocation in the cylinder bore, and means for injecting a spray of fuel into the chamber, the spray having its origin located between the plane of the inner face of the cylinder head and a plane of displacement of the piston from the inner face of the cylinder head, and the spray being directed towards the plane of the inner face of the cylinder head.

24. In an internal combustion engine, a cylinder having a bore extending therethrough, a cylinder head having an inner face extending across one end of the cylinder bore, and walls forming a chamber at one side of the cylinder and a passageway extending and communicating between the cylinder bore and the chamber, a piston operative for reciprocation in the cylinder bore, and means for injecting a spray of fuel into the chamber, the spray having its origin located between the plane of the inner face of the cylinder head and a plane of displacement of the piston from the inner face of the cylinder head, and the spray being directed towards the plane of the inner face of the cylinder head, the apex angle of the spray being substantially within an upper limit of 10 degrees and a lower limit of 6 degrees.

25. In an internal combustion engine, a cylinder having a bore extending therethrough, a cylinder head having an inner face extending across one end of the cylinder bore, and walls forming a chamber at one side of the cylinder and a passageway extending and communicating between the cylinder bore and the chamber, a piston operative for reciprocation in the cylinder bore, and means for injecting a spray of fuel into the chamber, the spray having its origin located between the plane of the inner face of the cylinder head and a plane of displacement of the piston from the inner face of the cylinder head, and the spray being directed towards the plane of the inner face of the cylinder head, the apex angle of the spray being substantially 8 degrees.

26. In an internal combustion engine, a cylinder having a bore extending therethrough, a cylinder head having an inner face extending across one end of the cylinder bore, and walls forming a chamber at one side of the cylinder and a passageway extending and communicating between the cylinder bore and the chamber, a piston operative for reciprocation in the cylinder bore, and means for injecting a spray of fuel into the chamber, the spray having its origin located between the plane of the inner face of the cylinder head and a plane of displacement of the piston from the inner face of the cylinder head, and the spray being directed towards the plane of the inner face of the cylinder head, the longitudinal axis of the spray extending through the chamber toward the cylinder head at an angle of substantially 16 degrees with a plane extending at right angles to and toward the longitudinal axis of the cylinder bore.

27. In an internal combustion engine, a cylinder having a bore extending therethrough, a cylinder head having an inner face extending across one end of the cylinder bore, and walls forming a chamber at one side of the cylinder and a passageway extending and communicating between the cylinder bore and the chamber, a piston operative for reciprocation in the cylinder bore, and means for injecting a spray of fuel into the chamber, the spray having its origin located between the plane of the inner face of the cylinder head and a plane of displacement of the piston from the inner face of the cylinder head, and the spray being directed towards the plane of the inner face of the cylinder head, the longitudinal axis of the spray extending through the chamber toward the cylinder head at an angle of substantially 16 degrees with a plane extending at right angles to and toward the longitudinal axis of the cylinder bore, and the apex angle of the spray being substantially within an upper limit of 10 degrees and a lower limit of 6 degrees.

28. In an internal combustion engine, a cylinder having a bore extending therethrough, a cylinder head having an inner face extending across one end of the cylinder bore, and walls forming a chamber at one side of the cylinder and a passageway extending and communicating between the cylinder bore and the chamber, a piston operative for reciprocation in the cylinder bore, and means for injecting a spray of fuel into the chamber, the spray having its origin located between the plane of the inner face of the cylinder head and a plane of displacement of the piston from the inner face of the cylinder head, and the spray being directed towards the plane of the inner face of the cylinder head, the longitudinal axis of the spray extending through the center of the chamber toward the cylinder head at an angle of within 45 degrees with a plane extending at right angles to and toward the longitudinal axis of the cylinder bore.

29. In an internal combustion engine, a cylinder having a cylinder bore extending therethrough, a cylinder head having an inner face extending across one end of the cylinder bore, a piston operating in the cylinder bore, walls forming a spherical chamber adjacent the cylinder bore, and walls forming a passageway extending and communicating between the cylinder bore and the spherical chamber, the passageway having one face laterally continuous with the inner face of the cylinder head and tangential to the curved face of the spherical chamber, and means for injecting fuel into the spherical chamber, the fuel injecting means including a nozzle adapted for injecting a conical spray of fuel particles into the spherical chamber, the longitudinal axis of the conical spray extending through the center of the spherical chamber and towards the cylinder head at an angle of within 45 degrees of a plane extending at right angles to and toward the longitudinal axis of the cylinder bore.

30. In an internal combustion engine, a cylinder having a cylinder bore extending therethrough, a cylinder head having an inner face extending across one end of the cylinder bore, a piston operating in the cylinder bore, walls forming a constant volume chamber adjacent the cylinder bore, walls forming a passageway extending and communicating between the cylinder bore and the constant volume chamber, the constant volume chamber having a curved inner surface symmetrical about an axis normal to the plane passing through the center of the constant volume chamber and the longitudinal axis of the cylinder bore and the passageway having one face laterally continuous with the inner face of the cylinder head and tangential to the symmetrical curved inner surface of the constant volume chamber, and means for injecting fuel into the constant volume chamber, the fuel injecting means including a nozzle adapted for injecting a conical spray of fuel particles into the constant volume chamber, the longitudinal axis of the conical spray extending through the axis of the constant volume chamber and towards the cylinder head at an angle of within 45 degrees of a plane extending at right angles to and toward the longitudinal axis of the cylinder bore.

31. In an internal combustion engine, a cylinder having a cylinder bore extending therethrough, a cylinder head having an inner face extending across one end of the cylinder bore, a piston operating in the cylinder bore, walls forming a constant volume chamber adjacent the cylinder bore, walls forming a passageway extending and communicating between the cylinder bore and the constant volume chamber, the constant volume chamber having a curved inner surface symmetrical about an axis normal to the plane passing through the center of the constant volume chamber and the longitudinal axis of the cylinder bore and the passageway having one face laterally continuous with the inner face of the cylinder head and tangential to the symmetrical curved inner surface of the constant volume chamber, and means for injecting fuel into the constant volume chamber, the fuel injecting means including a nozzle adapted for injecting a conical spray of fuel particles into the constant volume chamber, there being a mechanical clearance only between the end of the piston and the inner surface of the cylinder head, and the total volume of the constant volume chamber and the passageway which constitutes the clearance volume of the engine being relatively small with respect to the maximum volume of the varying volume chamber between the piston and the cylinder head so that the compression ratio of the engine is high, as for example, 15.8 to 1.

32. In an internal combustion engine, a cylinder having a bore extending therethrough, a cylinder head having an inner face extending across one end of the cylinder bore, and walls forming a chamber at one side of the cylinder and a passageway extending and communicating between the cylinder bore and the chamber, a piston operative for reciprocation in the cylinder bore, and means for injecting a spray of fuel into the chamber, the spray having its origin located between the plane of the inner face of the cylinder head and a plane of displacement of the piston from the cylinder head, there being a mechanical clearance only between the end of the piston and the inner surface of the cylinder head, and the total volume of the chamber and the passageway which constitutes the clearance volume of the engine being relatively small with respect to the maximum volume of the cylinder bore between the piston and the cylinder head, so that the compression ratio of the engine is high, as for example, 15.8 to 1.

OTIS D. TREIBER.